(12) United States Patent
Goto et al.

(10) Patent No.: US 6,582,826 B1
(45) Date of Patent: *Jun. 24, 2003

(54) GLASS-CERAMICS

(75) Inventors: Naoyuki Goto, Machida (JP); Junko Ishioka, Sagamihara (JP); Yasuyuki Kawashima, Sagamihara (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/594,105

(22) Filed: Jun. 14, 2000

Related U.S. Application Data

(63) Continuation-in-part of application No. 09/260,768, filed on Mar. 2, 1999, now Pat. No. 6,383,645.

(30) Foreign Application Priority Data

| Mar. 23, 1998 | (JP) | ............................................. 10-94020 |
| Apr. 20, 1998 | (JP) | ........................................ 10-125316 |
| Dec. 10, 1998 | (JP) | ........................................ 10-351682 |

(51) Int. Cl.$^7$ .......................... B32B 17/00; C03C 10/14; C03C 3/085

(52) U.S. Cl. ............................ 428/426; 501/4; 501/68; 501/69; 501/72

(58) Field of Search ............................... 428/426, 64.1, 428/64.4, 65.3, 65.6, 65.7, 65.5, 64.3, 432, 694 SG, 900; 501/63, 66, 68, 69, 72, 136, 4, 7

(56) References Cited

U.S. PATENT DOCUMENTS

| 3,721,584 | A | * | 3/1973 | Diem |
| 4,480,044 | A | * | 10/1984 | McAlinn |
| 4,979,973 | A | * | 12/1990 | Takita et al. |
| 5,336,642 | A | * | 8/1994 | Wolcott |
| 5,494,721 | A | * | 2/1996 | Nakagawa et al. |
| 5,567,217 | A | * | 10/1996 | Goto et al. |
| 5,804,520 | A | | 9/1998 | Morinaga et al. |
| 5,972,460 | A | * | 10/1999 | Tachiwana |
| 5,997,977 | A | * | 12/1999 | Zou et al. |
| 6,120,922 | A | | 9/2000 | Goto |
| 6,270,876 | B1 | | 8/2001 | Abe et al. |
| 6,287,663 | B1 | | 9/2001 | Goto |
| 6,327,874 | B1 | | 12/2001 | Goto |
| 6,413,890 | B1 | | 7/2002 | Goto |

FOREIGN PATENT DOCUMENTS

| EP | 781731 A | 12/1996 |
| EP | 0 810 586 | 12/1997 |
| EP | 0 875 886 | 11/1998 |
| JP | 7198935 | 12/1993 |
| JP | 11-016143 | 1/1998 |
| JP | 10-045426 | 2/1998 |
| JP | 10-158034 | 9/1998 |
| JP | 11-016142 | 1/1999 |
| JP | 11-016151 | 1/1999 |
| JP | 2000-143290 | 8/2001 |

\* cited by examiner

*Primary Examiner*—Deborah Jones
*Assistant Examiner*—Jennifer McNeil
(74) *Attorney, Agent, or Firm*—Hedman & Costigan, P.C.

(57) ABSTRACT

There is provided a glass-ceramic substrate which is suitable for use as a light filter. The glass-ceramic has a Young's modulus (GPa) within a range from 95 to 120 and includes 5.3 to 8 weight percent (expressed on an oxide basis) of $Al_2O_3$. Tile glass ceramic substrate preferably has, as its predominant crystal phases, (a) lithium disilicate ($Li_2O \cdot 2SiO_2$) and b) at least one of α-quartz (α-$SiO_2$) and α-quartz solid solution (α-$SiO_2$ solid solution), has a specific gravity within a range from 2.4 to 2.6 and has a coefficient of thermal expansion within a range from $65 \times 10^{-7}/°C$. to $130 \times 10^{-7}/°C$. within a temperature range from −50° C. to +70° C.

12 Claims, No Drawings

GLASS-CERAMICS

This application is a continuation-in-part application from U.S. Ser. No. 09/260,768 filed on Mar. 2, 1999 now U.S. Pat. No. 6,383,645.

BACKGROUND OF THE INVENTION

This invention relates to novel glass-ceramics and, more particularly, to glass-ceramics suitable for use as a light filter and, more particularly, to glass-ceramics suitable for use as a band-pass filter and a gain flattening filter.

There are light filters which cut or pass light of a specific wavelength and there are also light filters which reduce intensity of light without depending upon wavelength. The former includes a band-pass filter which passes only a specific wavelength, a notch pass filter which cuts a specific wavelength and high-pass and low-pass filters which pass only wavelengths shorter or longer than a specific wavelength. The latter includes an ND filter.

Light filters can be classified also into an absorption type filter and an interference type filter. A representative absorption type filter is the ND filter and a representative interference type filter is the band-pass filter. A substrate made of plastic is used for absorption type filters such as those for photography. Since a substrate for light filters which are subject to a strong laser beam requires durability and heat resistance property, amorphous glass is exclusively employed for such substrate.

The band-pass filters are made by forming, on a substrate made of, e.g., glass, a multi-layer film of dielectric by alternately laminating an H layer of a dielectric thin film having a high refractive index and an L layer of a dielectric thin film having a low refractive index.

In a band-pass filter which is used for the WDM (wavelength division multiplexing) optical communication system, temperature stability of the center wavelength of the band poses a problem when a narrow band width for passing wavelengths is set for applying the band-pass filter to a wavelength of a higher density. More specifically, the band-pass filter is a sensitive element in which the center wavelength of the band varies even with a slight variation in temperature and, therefore, temperature compensation should be made by a temperature controller when the band-pass filter is used. Such temperature controller, however, cannot actually be employed because of limitation in the space where the band-pass filter is located. The temperature stability has become a matter of increasing importance since it is necessary to reduce the band width as the amount of light information increases.

In the past, amorphous glass has been used as a substrate for the band-pass filter. This prior art substrate is not sufficient in its compressive stress to the film and its durability since its thermal expansion property and mechanical strength are not sufficiently high. Further, amorphous glass has low mechanical strength and therefore tends to produce micro-cracks in processing with resulting cracking or chipping off of corner portions of the product which reduces the yield of the product. Moreover, in amorphous glass, a relatively large amount of alkali ingredient must be added if a high thermal expansion property is to be provided and this poses a problem of elution of alkali ingredient during and after forming of the dielectric film on the substrate. Thus, amorphous glass cannot sufficiently satisfy the demands for a substrate for a light filter, particularly a substrate for a band-pass filter.

Known in the art are some glass-ceramics. For example, the glass-ceramics of a $SiO_2$—$Li_2O$—$MgO$—$P_2O_5$ system disclosed in U.S. Pat. No. 5,626,935 containing lithium disilicate ($Li_2O.2SiO_2$) and α-quartz (α-$SiO_2$) as main crystal phases is an excellent material as a material textured over the entire surface in which, by controlling the grain diameter of globular crystal grains of α-quartz, the conventional mechanical texturing or chemical texturing can be omitted and the surface roughness after polishing (Ra) can be controlled within a range from 15 Å to 50 Å. In this glass-ceramic, however, no discussion or suggestion is made about Young's modulus and a coefficient for thermal expansion which are important features of the present invention.

Japanese Patent Application Laid-open Publication No. Hei 9-35234 discloses a magnetic disk substrate made of a glass-ceramic of a $SiO_2$—$Al_2O_3$—$Li_2O$ system having predominant crystal phases of lithium disilicate ($Li_2O.2SiO_2$) and β-spodumene ($Li_2O.Al_2O_3.4SiO_2$) which has a negative coefficient of thermal expansion. This glass-ceramic has a composition which contains a relatively large amount of $Al_2O_3$ ingredient and in which growth of $SiO_2$ crystals such as α-quartz (α-$SiO_2$) is extremely restricted and, therefore, it is difficult in this glass-ceramic to obtain a coefficient of thermal expansion required in the present invention and, moreover, since the glass-ceramic is so hard that it has no good processability. Further, since this glass-ceramic requires a high temperature of 820° C. to 920° C. for crystallization which prevents a large scale production of the product at a competitive cost.

International Publication WO97/01164 which includes the above described Japanese Patent Application Laid-open Publication No. Hei 9-35234 discloses a glass-ceramic for a magnetic disk in which the lower limit of the $Al_2O_3$ ingredient is lowered and temperature for crystallization is reduced (680° C.–770° C.). A sufficient improvement however cannot be achieved by merely lowering the lower limit of the $Al_2O_3$ ingredient. Besides, crystals grown in all examples disclosed are β-eucriptite ($Li_2O.Al_2O_3.2SiO_2$) which has a negative coefficient of thermal expansion and, therefore, has the same disadvantage as the above described prior art glass-ceramic.

It is, therefore, an object of the invention to provide a material suitable for a substrate for a light filter which has eliminated the above described disadvantages of the prior art substrate and has a thermal expansion property which is sufficient for avoiding variation in the refractive index at a temperature at which a filter formed with a mono-layer or multi-layer film is used (i.e., having a high coefficient of thermal expansion and thereby imparting compressive stress to the film to improve temperature stability of the refractive index of the film) and also has a mechanical property which imparts sufficient durability to the filter and further has excellent light transmittance.

SUMMARY OF THE INVENTION

Accumulated studies and experiments made by the inventors of the present invention for achieving the above described object of the invention have resulted in the finding, which has led to the present invention, that, glass-ceramics having, as their predominant crystal phases, lithium disilicate ($Li_2O.2Si_{O2}$) and α-quartz (α-$SiO_2$) or α-quartz solid solution (α$SiO_2$ solid solution) and having Young's modulus (GPa) of 95 to 120 have an excellent processability and is suitable for use as a substrate for a light filter and, more particularly, as a substrate for a band-pass filter or a gain flattening filter.

For achieving the object of the invention, there is provided a glass-ceramic having Young's modulus (GPa) within a range from 95 to 120 and comprising 5.3 to less than 10 weight percent (expressed on oxide basis) of $Al_2O_3$.

In one aspect of the invention, the glass-ceramic has specific gravity within a range from 2.4 to 2.6.

In another aspect of the invention, the glass-ceramic has a coefficient of thermal expansion which is within a range from $65\times10^{-7}/°$ C. to $130\times10^{-7}/°$ C. within a temperature range from $-50°$ C. to $+70°$ C.

In another aspect of the invention, predominant crystal phases the glass-ceramic are (a) lithium disilicate ($Li_2O.2SiO_2$) and (b) at least one of α-quartz (α-$SiO_2$). and α-quartz solid solution (α-$SiO_2$ solid solution).

In another aspect of the invention, the glass-ceramic is substantially free of $Na_2O$ and PbO.

In another aspect of the invention, the glass-ceramic comprises 0.3 weight percent or over (expressed on the basis of composition of the oxide) of MgO.

In another aspect of the invention, the glass-ceramic has a composition which consists in weight percent expressed on the basis of composition of oxides:

$SiO_2$ 71–81%
$Li_2O$ 8–11%
$K_2O$ 0–3%
MgO 0.3–2%
ZnO 0–1%
$P_2O_5$ 1–3%
$ZrO_2$ 0.5–5%
$TiO_2$ 0–3%
$Al_2O_3$ 5.3–8%
$Sb_2O_3$ 0.1–0.5%
$SnO_2$ 0–5%
$MoO_3$ 0–3%
NiO 0–2%
CoO 0–3%
$Cr_2O_3$ 0–3% and has, as predominant crystal phases, a) lithium disilicate ($Li_2O.2SiO_2$) and b) at least one of α-quartz (α-$SiO_2$) and α-quartz solid solution (α-$SiO_2$ solid solution).

In another aspect of the invention, the glass-ceramic has, as its predominant crystal phases, lithium disilicate ($Li_2O.2SiO_2$) and α-quartz (α-$SiO_2$) which have fine globular crystal grains.

In another aspect of the invention, average grain diameter of the crystal phases is 0.30 μm or below.

In another aspect of the invention, the glass-ceramic is obtained by melting glass materials, forming molten glass, annealing formed glass and then heat treating the formed glass for nucleation under nucleation temperature within a range from 550° C. to 650° C. for one to twelve hours and further heat treating the formed glass for crystallization under crystallization temperature within a range from 680° C. to 800° C. for one to twelve hours.

In another aspect of the invention, there is provided a glass-ceramic substrate for a light filter using a glass-ceramic as described above.

In another aspect of the invention, there is provided a light filter provided by forming a multi-layer film on a glass-ceramic as described above.

These and other objects and features of the invention will become more apparent from the description made below.

DETAILED DESCRIPTION OF THE INVENTION

Reasons for limiting the physical properties, surface characteristics, predominant crystal phases and crystal grain diameter, and composition will now be described. The composition of the glass-ceramic is expressed in weight percent on the basis of composition of oxides as in their base glass.

Description will be first made about Young's modulus. As described above, as a glass-ceramic used for a light filter which is formed with a multi-layer film thereon, particularly for a band-pass filter or a gain flattening filter, it is preferable for the glass-ceramic to have the Young's modulus as defined in the claims of the present application from the view point of processing and various handling processes. For the use as the light filter, the glass-ceramic is processed to small chips each having a size in the order of, for example, 1 mm×1 mm×1 mm and, if Young's modulus is lower than the above defined range, micro-cracking or chipping off of corner portions of these small chips will take place in processing of the glass-ceramic to such small chips with resulting significant drop in the yield of the product. Micro-cracking or chipping off of corner portions of small chips does not take place at a significant rate in processing of the glass-ceramic of the present invention presumably by virtue of synergistic effect of a large Young's modulus and restriction of growth of micro-cracks by precipitated crystal grains of the glass-ceramic.

As regards specific gravity, the glass-ceramic should preferably have as low specific gravity as possible. In most cases where the glass-ceramic is used as a light filter, many small chips, each constituting a light filter are mounted on one unit of optical fiber. The light filter made of the glass-ceramic of the present invention has excellent stability in the center wavelength of the filter band and also has high wavelength resolution and, therefore, the unit of optical fiber can receive many wavelengths of light. Accordingly, it is important to reduce the weight of the unit and, for this purpose, specific gravity of the glass-ceramic must be taken into consideration. If, however, the specific gravity of the glass-ceramic is reduced to an excessive degree, it becomes difficult to achieve a desired Young's modulus by reason of balance of ratio between precipitated crystal phases and ratio of precipitation of crystal phases in the glass-ceramics. Having regard to such balance, it has been found that the specific gravity should preferably be within a range from 2.4 to 2.6. Having further regard to this balance, it has been found that Young's modulus (GPa)/specific gravity should preferably be 37 or over and 50 or below.

Coefficient of thermal expansion is a very important factor for improving the wavelength resolution of the multi-layer film. More specifically, stability of center wavelength of a band against temperature is very important and, for this purpose, a coefficient of thermal expansion which is larger than that of a film forming material is required. As a result of studies and experiments made by the inventors of the present invention, it has been found that, in a band-pass filter, stability of the center wavelength against temperature depends to some extent on a refractive index temperature coefficient of a dielectric which constitutes the thin film and, to a larger extent than that, on a coefficient of thermal expansion of the substrate. This is because refractive index is also determined by a film atomic density of the thin film. That is, the higher the film atomic density of the thin film is, the smaller becomes variation caused by the temperature of the center wavelength. The film atomic density of the thin film is greatly influenced by the coefficient of thermal expansion of the substrate for the light filter on which the thin film is formed. More specifically, the temperature of the substrate during the film forming process becomes about 200° C. and the substrate thereby is considerably expanded.

The thin film is formed on this expanded substrate and, as the substrate is cooled, the thin film is subjected to compressive stress due to difference in the coefficient of thermal expansion between them. As a result, the film atomic density of the thin film increases and the refractive index thereby increases. As the coefficient of thermal expansion of the substrate increases, the compressive stress applied to the dielectric thin film formed on the substrate increases with the result that variation in the refractive index due to temperature at which the filter is used increases. In a region of the compressive stress above a certain value, variation of refractive index relative to change in temperature is saturated with a small value of variation. In other words, by imparting compressive stress above a certain value to the dielectric thin film, variation in the center wavelength relative to the temperature becomes constant with a small value of variation. For this reason, it is desirable to set the coefficient of thermal expansion of the glass-ceramic at a larger value than the coefficient of thermal expansion of the dielectric thin film.

It has been found that, if the coefficient of thermal expansion within the temperature range from −50° C. to +70° C. is $65 \times 10^{-7}/°$ C. or over, sufficient compression stress can be imparted to the film with a temperature range in which the glass-ceramic is used as a band-pass filter and that, if the coefficient of thermal expansion exceeds $140 \times 10^{-7}/°$ C. differences in the coefficient of thermal expansion between the substrate and the filter becomes so large that problems such as separation of the film from the substrate take place. A preferable range of the coefficient of thermal expansion is $65 \times 10^{-7}/°$ C. to $130 \times 10^{-7}/°$ C., a more preferable range is $75 \times 10^{-7}/°$ C. to $130 \times 10^{-7}/°$ C. and the most preferable range is $95 \times 10^{-7}/°$ C. to $130 \times 10^{-7}/°$ C.

As regards the shape and grain diameter of the precipitated crystal phases, crystal grains and their shape are important factors for achieving the above described characteristics of the glass-ceramic. The desired coefficient of thermal expansion cannot be achieved if the grain diameter of the crystal grains of the respective crystal phases is above or below the claimed range. The crystal grains should preferably be fine globular grains from the standpoint of processability and surface roughness. More specifically, the the crystal grain diameter (average) should preferably be 0.30 μm or below, more preferably less than 0.30 μm and, most preferably, 0.05 μm or over and less than 0.3 μm.

For realizing the above described physical properties and coefficient of thermal expansion, it has been found that the combination of lithium disilicate ($Li_2O.SiO_2$) and α-quartz (α-$SiO_2$) as predominant crystal phases is the best combination.

The $Na_2O$ or PbO ingredient is not substantially contained in the glass-ceramic of the invention. $Na_2O$ is an ingredient which poses problems in forming of the multi-layer film. This is because Na ions diffuse in the multi-layer film to deteriorate the properties of the film. PbO is an undesirable ingredient from the viewpoint of the environment protection. Use of these ingredients, therefore, should be avoided.

Reasons for limiting the composition range of the base glass as defined in the claims will now be described.

The $SiO_2$ ingredient is a very important ingredient for growing lithium disilicate ($Li_2O.2SiO_2$) and α-quartz (α-$SiO_2$) as predominant crystal phases by heat treating the base glass. If the amount of this ingredient is below 71%, grown crystals of the glass-ceramic becomes instable and its texture tends to become coarse. If the amount of this ingredient exceeds 81%, difficulty arises in melting and forming of the glass.

The $SiO_2$ ingredient is a very important ingredient for growing lithium disilicate ($Li2O.2SiO_2$) as predominant crystal phases by heat treating the base glass. If the amount of this ingredient is below 8%, difficulty arises in growing of this crystal phase and also in melting of the base glass. If the amount of this ingredient exceeds 11%, the grown crystal is instable and its texture tends to become coarse and its chemical durability is deteriorated.

The $K_2O$ ingredient improves the melting property of the glass and prevents the grown crystal from becoming too coarse. The amount of up to 3% of this ingredient will suffice.

The MgO and ZnO ingredients are ingredients which improve the melting property of the glass and prevent the grown crystals from becoming coarse and also are effective for enabling the lithium disilicate ($Li_2O.2SiO_2$), α-quartz (α-$SiO_2$) and α-quartz solid solution (α-$SiO_2$ solid solution) crystals to grow in the globular form. For this purpose, the amount of the MgO ingredient should preferably be 0.3% or over. The amount of the ZnO ingredient should more preferably be 0.1% or over. If the amounts of these ingredients are excessive, grown crystals become instable and their textures tend to become coarse. For this reason, the amount of the MgO ingredient should preferably be 2% or less and, more preferably, 1% or less. Likewise, the amount of the ZnO ingredient should preferably be 2% or less and, more preferably, be 1% or less. The sum of the MgO and ZnO ingredients should preferably be 2% or less and, more preferably, 1% or less.

The $P_2O_5$ ingredient is indispensable as a nucleating agent. If the amount of this ingredient is below 1%, growth of nucleus will become insufficient with resulting abnormal growth of crystals. If the amount of this ingredient exceeds 3%, opaque devitrification will take place in the base glass.

The $ZrO_2$ and $TiO_2$ ingredients are important ingredients which, in addition to the function, like the $P_2O_5$ ingredient, as nucleating agents, are effective for making the grown crystals fine, improving the mechanical strength and improving chemical durability. If the amount of the $ZrO_2$ ingredient is below 0.5%, these effects cannot be achieved. If the amount of the $ZrO_2$ ingredient exceeds 5% or the amount of the $TiO_2$ ingredient exceeds 3%, difficulty arises in melting of the base glass and $ZrSiO_4$ and the like slug are left unmelted.

The $Al_2O_3$ ingredient is effective for improving chemical durability and mechanical strength of the glass-ceramic. The type of grown crystal differs depending upon conditions of heat treatment. Having regard to various conditions of heat treatment, the amount of this ingredient should be below 10% for growing lithium disilicate ($Li_2O.2SiO_2$) and α-quartz. A preferable range of this ingredient is 5.3–8%.

The $Sb_2O_3$ ingredient is added as a refining agent in melting the base glass. If the amount of this ingredient is below 0.1%, this effect cannot be achieved. The addition of this ingredient up to 0.5% will suffice.

The $SnO_2$ and $MoO_3$ ingredients may be added because they have an excellent translucency in the glass state and therefore addition of these ingredients facilitate examination of materials before crystallization. It will suffice if the amount of the $SnO_2$ ingredient up to 5% is added and the amount of the $MoO_3$ ingredient up to 3% is added.

The NiO, CoO, $Cr_2O_3$ ingredients may be added for adjusting the above described characteristics of the glass-ceramic within a range not impairing these characteristics. It will suffice if the amount of the NiO ingredient up to 2%, the amount of the CoO ingredient up to 3% and the amount of the $Cr_2O_3$ ingredient up to 3% are added respectively.

Additionally, the glass-ceramic of the invention is required to be free from defects such as crystal anisotropy, foreign matters and impurities and have a fine and uniform texture and further is required to have mechanical strength and high Young's modulus in processing the glass-ceramic to small chips. The glass-ceramic of the present invention satisfies all these requirements.

For manufacturing the glass-ceramic substrate for an information storage medium according to the invention, glass materials of the above described composition are melted and is subjected to a hot or cold forming process. The formed glass is subjected to heat treatment under a temperature within a range from 550° C. to 650° C. for one to twelve hours for nucleation and then is subjected to further heat treatment under a temperature within a range from 680° C. to 800° C. for one to twelve hours for crystallization.

Predominant crystal phases of the glass-ceramic obtained by the heat treatments are lithium disilicate ($Li_2O \cdot 2SiO_2$) and α-quartz (α-$SiO_2$) having globular crystal grains with a grain diameter of 0.05 μm or over and 0.30 μm or below.

EXAMPLES

Examples of the present invention will now be described.

Tables 1 to 3 show examples (No. 1 to No. 16) of compositions of the glass-ceramic substrate for an information storage medium made according to the invention together with the temperature of nucleation, temperature of crystallization, predominant crystal phases, crystal grain diameter (average), surface roughness (Ra) after polishing, Rmax, Young's modulus, specific gravity, Young's modulus (GPa)/specific gravity and coefficient of thermal expansion. Table 4 shows compositions and the above properties of the prior art $SiO_2$—$Li_2O$—MgO—$P_2O_5$ system glass-ceramic disclosed in U.S. Pat. No. 5,626,935 (Comparative Example 1) and the prior art $SiO_2$—$Al_2O_3$—$Li_2O$ system glass-ceramics disclosed in Japanese Patent Application Laid-open Publication No. Hei 9-35234 (Comparative Example 2) and International Publication No. WO97/01164 (Comparative Example 3).

In the tables, lithium disilicate is abbreviated as "LD" and α-quartz as "α-q"

TABLE 1

| | Examples | | | | |
|---|---|---|---|---|---|
| | 1 | 2 | 3 | 4 | 5 |
| $SiO_2$ | 75.3 | 75.5 | 77.2 | 77.5 | 74.3 |
| $Li_2O$ | 9.9 | 9.9 | 10.4 | 9.9 | 9.5 |
| $K_2O$ | 2.0 | 2.0 | | | 2.0 |
| MgO | 0.8 | 1.0 | 0.5 | 0.5 | 0.5 |
| ZnO | 0.5 | 0.5 | 0.5 | 0.5 | 0.5 |
| $P_2O_5$ | 2.0 | 2.0 | 2.0 | 1.8 | 2.0 |
| $ZrO_2$ | 2.3 | 2.3 | 2.6 | 2.6 | 2.0 |
| $TiO_2$ | | | | | |
| $Al_2O_3$ | 7.0 | 6.6 | 6.6 | 7.0 | 6.0 |
| $Sb_2O_3$ | 0.2 | 0.2 | 0.2 | 0.2 | 0.2 |
| $As_2O_3$ | | | | | |
| $SnO_2$ | | | | | 1.5 |
| $MoO_3$ | | | | | 1.5 |
| NiO | | | | | |
| CoO | | | | | |
| $Cr_2O_3$ | | | | | |
| Nucleation temperature (° C.) | 550 | 550 | 550 | 550 | 560 |
| Crytallization temperature (° C.) | 780 | 770 | 780 | 780 | 780 |
| Crystal phases and grain diameter (average) (μm) | LD 0.10 α-q 0.20 | LD 0.10 α-q 0.20 | LD 0.10 α-q 0.20 | LD 0.10 α-q 0.20 | LD 0.10 α-q 0.20 |
| Young's modulus(GPa) | 100 | 105 | 113 | 120 | 105 |
| Specific gravity | 2.47 | 2.48 | 2.50 | 2.52 | 2.48 |
| Young's modulus(GPa)/ specific gravity | 40 | 42 | 45 | 48 | 42 |
| Surface roughness (Ra) | 7.0 | 8.0 | 7.5 | 6.0 | 7.3 |
| Maximum surface roughness (Rmax) | 79.0 | 83.0 | 80.4 | 72.0 | 81.2 |
| Coefficient of thermal expansion ($10^{-7}$/° C.) (−50° C.→70° C.) | 110 | 100 | 119 | 123 | 115 |

TABLE 2

| | Examples | | | | |
|---|---|---|---|---|---|
| | 6 | 7 | 8 | 9 | 10 |
| $SiO_2$ | 73.5 | 71.3 | 71.3 | 71.0 | 73.8 |
| $Li_2O$ | 10.0 | 10.0 | 10.0 | 11.0 | 9.9 |
| $K_2O$ | 1.5 | 1.5 | 1.5 | 1.5 | 2.0 |
| MgO | 0.5 | 1.0 | 1.0 | 1.0 | 0.8 |
| ZnO | 0.5 | 0.5 | 0.5 | 0.5 | 0.5 |
| $P_2O_5$ | 2.0 | 2.0 | 2.0 | 2.0 | 2.0 |
| $ZrO_2$ | 1.5 | 2.0 | 2.0 | 2.0 | 2.8 |
| $TiO_2$ | 1.5 | 1.5 | 1.5 | 1.0 | |
| $Al_2O_3$ | 6.0 | 7.0 | 7.0 | 6.8 | 7.0 |
| $Sb_2O_3$ | 0.2 | 0.2 | 0.2 | 0.2 | 0.2 |
| $As_2O_3$ | | | | | |
| $SnO_2$ | | | 1.5 | 2.0 | |
| $MoO_3$ | | | 1.5 | 1.0 | |
| NiO | 0.5 | 0.5 | | | |
| CoO | 1.8 | 2.0 | | | |
| $Cr_2O_3$ | 0.5 | 0.5 | | | |
| Nucleation temperature (° C.) | 560 | 560 | 560 | 590 | 570 |
| Crystallization temperature (° C.) | 770 | 760 | 780 | 790 | 740 |
| Crystal phases and grain diameter (average) (μm) | LD 0.10 α-q 0.20 | LD 0.10 α-q 0.20 | LD 0.10 α-q 0.05 | LD 0.10 α-q 0.05 | LD 0.05 α-q 0.05 |
| Young's modulus(GPa) | 100 | 115 | 118 | 118 | 100 |
| Specific gravity | 2.54 | 2.54 | 2.53 | 2.48 | 2.47 |
| Young's modulus(GPa)/ specific gravity | 39 | 45 | 47 | 48 | 40 |
| Surface roughness (Ra) | 5.5 | 6.3 | 5.3 | 5.0 | 3.0 |
| Maximum surface roughness (Rmax) | 63.0 | 76.0 | 53.0 | 51.0 | 32.0 |
| Coefficient of thermal expansion ($10^{-7}$/° C.) (−50° C.→70° C.) | 98 | 100 | 105 | 108 | 95 |

TABLE 3

| | Examples | | |
|---|---|---|---|
| | 11 | 12 | 13 |
| $SiO_2$ | 75.0 | 75.8 | 73.1 |
| $Li_2O$ | 9.0 | 9.5 | 9.5 |
| $K_2O$ | 2.5 | 1.0 | 0.5 |
| MgO | 1.0 | 0.3 | 1.5 |
| ZnO | | | |
| $P_2O_5$ | 1.5 | 2.2 | 2.5 |
| $ZrO_2$ | 3.3 | 5.0 | 0.5 |
| $TiO_2$ | | | 0.5 |
| $Al_2O_3$ | 7.4 | 6.0 | 7.0 |
| $Sb_2O_3$ | 0.1 | 0.2 | 0.2 |

TABLE 3-continued

| | Examples | | |
|---|---|---|---|
| | 11 | 12 | 13 |
| $As_2O_3$ | 0.1 | | 0.2 |
| $SnO_2$ | 0.1 | | 4.5 |
| $MoO_3$ | | | |
| NiO | | | |
| CoO | | | |
| $Cr_2O_3$ | | | |
| Nucleation temperature(° C.) | 600 | 550 | 570 |
| Crystallization temperature (° C.) | 750 | 760 | 730 |
| Crystal phases and | LD | LD | LD |
| grain diameter (average) | 0.10 | 0.05 | 0.10 |
| (μm) | α-q | α-q | α-q |
| | 0.10 | 0.05 | 0.10 |
| Young's modulus(GPa) | 110 | 110 | 116 |
| Specific gravity | 2.46 | 2.46 | 2.56 |
| Young's modulus(GPa)/specific gravity | 45 | 45 | 45 |
| Surface roughness (Ra) | 5.0 | 3.0 | 4.5 |
| Maximum surface roughness (Rmax) | 56.0 | 29.0 | 51.0 |
| Coefficient of thermal expansion ($10^{-7}$/° C.) (−50° C.−+70° C.) | 115 | 95 | 100 |

TABLE 4

| | Comparative Examples | | |
|---|---|---|---|
| | 1 | 2 | 3 |
| $SiO_2$ | 69.0 | 76.1 | 76.0 |
| $Li_2O$ | 9.0 | 11.8 | 10.0 |
| $K_2O$ | 7.0 | 2.8 | 2.8 |
| MgO | 3.5 | | |
| ZnO | 0.5 | | |
| $P_2O_5$ | 1.5 | 2.0 | 2.0 |
| $ZrO_2$ | 1.0 | | |
| PbO | 1.5 | | |
| $Al_2O_3$ | 5.0 | 7.1 | 7.0 |
| BaO | 1.5 | | |
| $Sb_2O_3$ | | 0.2 | 0.2 |
| $As_2O_3$ | 0.5 | | |
| Nucleation temperature(° C.) | 450 | 500 | 450 |
| Crytallization temperature(° C.) | 760 | 850 | 750 |
| Crystal phases and | LD | LD | LD |
| grain diameter | 0.10 | 0.10 | 0.10 |
| (average)(μm) | α-q | β-spodumene | β-cristobalite |
| | 0.60 | 0.80 | 0.50 |
| Young's modulus(GPa) | 87 | 89 | 90 |
| Specific gravity | 2.43 | 2.53 | 2.48 |
| Young's modulus(GPa)/specific gravity | 36 | 35 | 36 |
| Surface roughness (Ra) | 15 | 17 | 10 |
| Maximum surface roughness (Rmax) | 180 | 230 | 124 |
| Coefficient of thermal expansion ($10^{-7}$/° C.) (−50° C.−+70° C.) | 64 | 60 | 64 |

For manufacturing the glass-ceramic substrate of the above described examples, materials including oxides, carbonates and nitrates are mixed and molten in conventional melting apparatus at a temperature within the range from about 1350° C. to about 1450° C. The molten glass is stirred to homogenize it and thereafter formed into a disk shape and annealed to provide a formed glass. Then, the formed glass is subjected to heat treatment to produce the crystal nucleus under a temperature within the range from 550° C. to 650° C. for about one to twelve hours and then is further subjected to heat treatment for crystallization under a temperature within the range from 680° C. to 800° C. for about one to twelve hours to obtain a desired glass-ceramic. Then, this glass-ceramic is lapped with lapping grains having average grain diameter ranging from 5 μm to 30 μm for about 10 minutes to 60 minutes and then is finally polished with cerium oxide having grain diameter ranging from 0.5 μm to 2 μm for about 30 minutes to 60 minutes.

The crystal grain shape and grain diameter (average) of the respective crystal phases were measured by a transmission electron microscope (TEM). The type of the respective crystal grains were identified by the TEM structure analysis.

The coefficient of thermal expansion was measured according to JOGIS (Japan Optical Glass Industry Standard) 06 and the surface roughness Ra (arithmetic mean roughness) was measured by an atomic force microscope AFM).

The Young's modulus was measured by the ultrasonic pulse technique of JIS (Japanese Industrial Standards) R1602 and the specific gravity was measured according to JOGIS 06.

As shown in Tables 1 to 4, the glass ceramics of the present invention are different from the comparative examples of the prior art glass-ceramics in the predominant crystal phases and crystal grain diameter (average). In the glass ceramics of the present invention, crystal grains of lithium disilicate (($Li_2O.2SiO_2$) and α-quartz (α-$SiO_2$) are fine globular grains whereas the glass-ceramics of the Comparative Examples 1, 2 and 3 have a large grain diameter (average) of 0.5 μm or over.

As regards Young's modulus, specific gravity and Young's modulus (GPa)/specific gravity, the glass-ceramics of the present invention have excellent Young's modulus (GPa)/specific gravity of 39 or over whereas the glass-ceramics of Comparative Examples 1, 2 and 3 have Young's modulus (GPa)/specific gravity of less than 37 and therefore cannot sufficiently cope with a drive of a high speed rotation. Further, as regards the coefficient of thermal expansion, the glass-ceramics of the present invention have a coefficient of thermal expansion of 95×$10^{-7}$/° C. or over whereas the glass-ceramics of the Comparative Examples 1, 2 and 3 have a low coefficient of thermal expansion of 64×$10^{-7}$/° C. or below. Particularly, the glass-ceramics of Comparative Examples 2 and 3 contain β-spodumene and β-cristobalite which are crystal phases having a negative thermal expansion characteristic and, therefore, have a low thermal expansion characteristic which is insufficient for maintaining stability of the center wavelength of the multi-layer film to the temperature.

On the glass-ceramic substrates of the above described examples are formed a multi-layer film (e.g., a film of $TiO_5/SiO_2$, $Ta_2O_2/SiO_2$ and $Nb_2O_5/SiO_2$) by the sputtering method to provide a light filter. In the light filter obtained, variation in the center wavelength of transmitted light relative to temperature is significantly reduced whereby excellent wavelength resolution of the filter can be achieved.

As described in the foregoing, according to the invention, glass-ceramic substrates for a light filter having an excellent stability of a center wavelength to temperature can be provided. The features of the glass-ceramic of the invention, i.e., high light transmittance, high thermal expansion property, high Young's modulus and high bending strength, are suitable for an interference type filter, particularly a band-pass filter and are most suitable for WDM and DWDM (density wavelength division multiplexing) in optical communication systems. Further, the band-pass filter elements which are provided by forming multi-layer dielectric films of $TiO_2/SiO_2$, $Ta_2O_5/SiO_2$ and $Nb_2O_5/SiO_2$ on the glass-ceramic substrates of the invention have an excellent temperature stability of the center wavelength and can be used not only for optical communication systems on the ground but also for space-based satellites.

What is claimed is:

1. A glass-ceramic substrate for a light filter having Young's modulus (GPa) within a range from 95 to 120 and comprising 5.3–8 weight percent of $Al_2O_3$ and 8.8–11 weight percent of $Li_2O$ based on the total content of the oxides.

2. A glass-ceramic substrate for a light filter as defined in claim 1 having a specific gravity within a range from 2.4 to 2.6.

3. A glass-ceramic substrate for a light filter as defined in claim 1 wherein a coefficient of thermal expansion is within a range from $65 \times 10^{-7}/°C$ to $130 \times 10^{-7}/°C$ within a temperature range from −50° C. to +70° C.

4. A glass-ceramic substrate for a light filter as defined in claim 1 wherein a coefficient of thermal expansion is within a range from $65 \times 10^{-7}/°C$ to $140 \times 10^{-7}/°C$ within a temperature range from −50° C. to +70° C.

5. A glass-ceramic substrate for a light filter as defined in claim 1 wherein predominant crystal phases are (a) lithium disilicate ($Li_2O.2SiO_2$) and (b) al least one of α-quartz (α-$SiO_2$) and α-quartz solid solution (α-$SiO_2$ solid solution).

6. A glass-ceramic substrate for a light filter as defined in claim 1 which is substantially free of $Na_2O$ and $PbO$.

7. A glass-ceramic substrate for a light filter as defined in claim 1 comprising 0.3 weight percent or over of MgO expressed on the basis of composition of the oxide.

8. A glass-ceramic substrate for a light filter as defined in claim 1 having a composition which comprises in weight percent based on the total content of the oxides:

| | |
|---|---|
| $SiO_2$ | 71–81% |
| $Li_2O$ | 8.8–11% |
| $K_2O$ | 0–3% |
| MgO | 0.3–2% |
| ZnO | 0–1%64 |
| $P_2O_5$ | 1–3% |
| $ZrO_2$ | 0.5–5% |
| $TiO_2$ | 0–3% |
| $Al_2O_3$ | 5.3–8% |
| $Sb_2O_3$ | 0.1–0.5% |
| $SnO_2$ | 0–5% |
| $MoO_3$ | 0–3% |
| NiO | 0–2% |
| CcO | 0–3% |
| $Cr_2O_3$ | 0–3% | and having, as predominant crystal phases, (a) lithium disilicate ($Li_2O.2SiO_2$) and (b) at least one of α-quartz (α-$SiO_2$) and α-quartz solid solution (α-$SiO_2$ solid solution).

9. A glass-ceramic substrate for a light filter as defined in claim 1 having, as predominant crystal phases, lithium disilicate ($Li_2O.2SiO_2$), α-quartz (α-$SiO_2$) and α-quartz solid solution (α-$SiO_2$ solid solution) which have fine globular crystal grains.

10. A glass-ceramic substrate for a light filter as defined in claim 1 wherein average grain diameter of the crystal phases is 0.30 μm or below.

11. A glass-ceramic substrate for a light filter as defined in claim 1 obtained by melting glass materials, forming molten glass, annealing formed glass and then heat treating the formed glass for nucleation under nucleation temperature within a range from 550° C. to 650° C. for one to twelve hours and further heat treating the formed glass for crystallization under crystallization temperature within a range from 680° C. to 800° C. for one to twelve hours.

12. A light filter provided by forming a multi-layer film on a glass-ceramic substrate for a light filter as defined in claim 1.

* * * * *